MECHANISM FOR
POSITIONING REEL

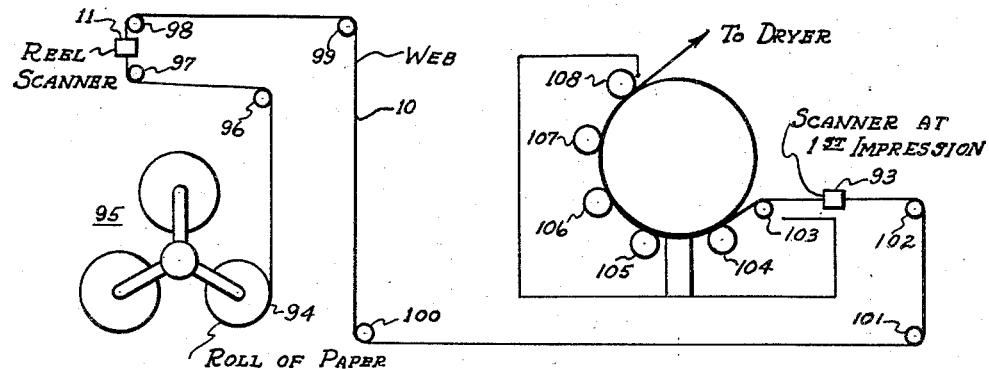
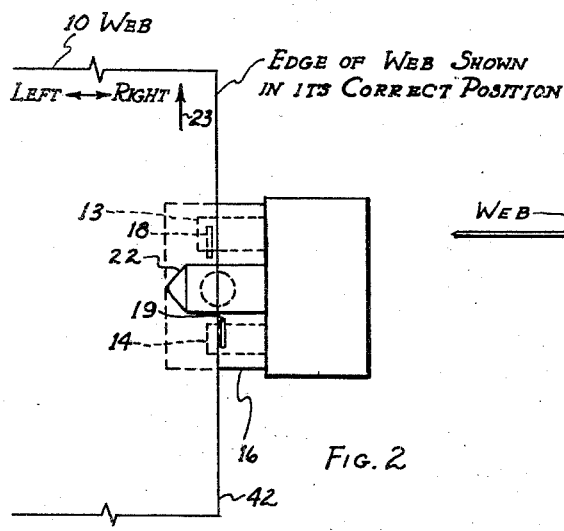
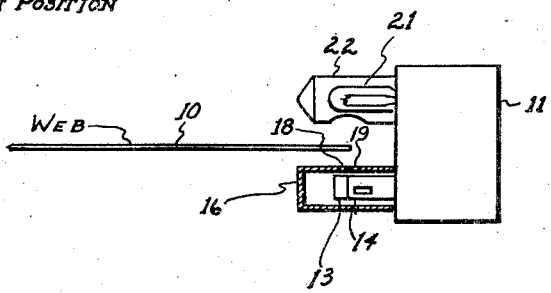
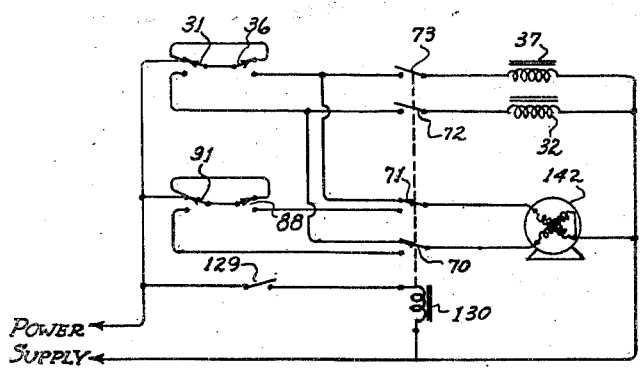

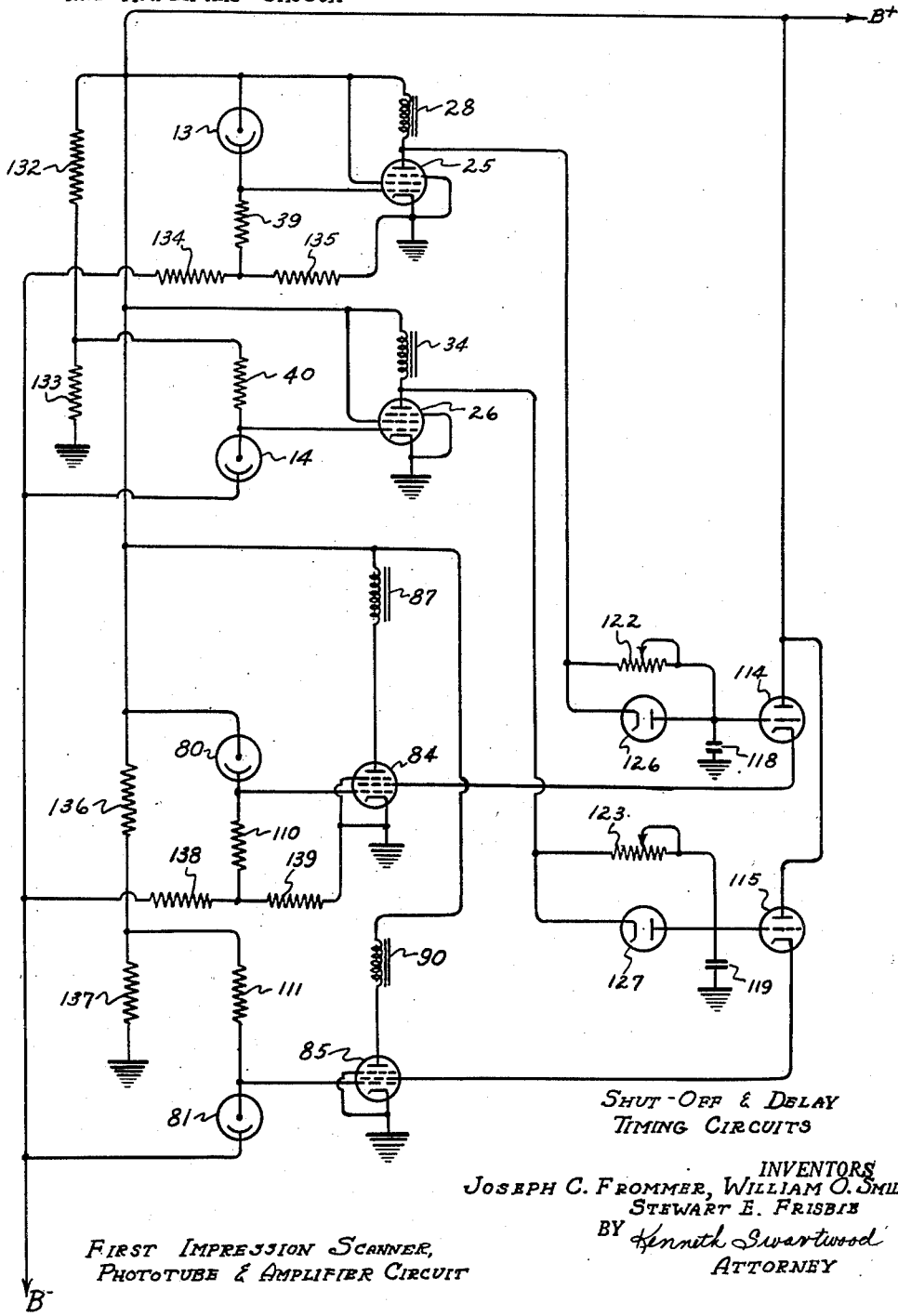

SCANNER POSITIONING MEANS

Patented June 23, 1953  2,643,117

UNITED STATES PATENT OFFICE 2,643,117

AUTOMATIC CONTROL SYSTEM

Stewart Edwin Frisbie and William Owen Smiley, Danville, Ill., and Joseph C. Frommer, Cincinnati, Ohio, assignors to Electric Eye Equipment Company, Danville, Ill., a corporation of Delaware Application August 29, 1949, Serial No. 112,988

3 Claims. (Cl. 271—2.6)

This invention relates to a new and improved method of automatic control. Automatic controls usually consist of inspection devices, evaluating devices and correcting devices. The inspection device generates various signals depending on the position, state or quality resulting from certain operations. The evaluating device, in response to signals from the inspection device, causes the correcting device to make corrections when necessary. As an example, our co-pending patent application 101,646, filed June 27, 1949 describes an automatic control for keeping the paper web of rotary printing presses in a desired lateral position with respect to the printing cylinders or folding and cutting mechanisms. In that automatic control, an inspection device called a scanner generates signals in response to variations in the lateral position of the web, an evaluating device, which is an electrical amplifier, closes or opens certain relays in response to these signals, and a correcting device, consisting of tilt rollers and associated driving mechanisms, is actuated by the relays of the evaluating device.

In certain applications of an automatic control for maintaining a given lateral position of the web in a printing press, the correcting means must be located a considerable distance from the point at which the web must be kept in a certain lateral position. One example of this is the first printing cylinder usually referred to as the first impression. The usual means for positioning the web at the first impression consists of adjusting the lateral position of the roll of paper supplying the web to the press. Usually there is a long length of web between the paper roll and the first impression.

Now, with the inspection device or scanner placed close to the first impression, a sudden change in the lateral position of the paper, as may occur when the beginning of a new roll is spliced to the end of a used up roll, would not be detected until the splice reached the first impression. As a consequence, the full length of web between paper roll and first impression would be printed with the lateral error of the splice. Furthermore, to prevent "hunting" under all conditions, it is necessary to make corrections in small increments delaying between each small readjustment until the scanner can detect whether or not additional correcton is required. This would result in a rather slow process of correction particularly in a case where the web suddenly moved an extreme distance from its correct position.

To avoid this slow process of correction, the scanner might be located near the paper roll. Error in the position of the roll of paper would then be detected immediately and correction could be made quickly. We have found, however, that the lateral position of the web near the paper roll is not necessarily in line with its lateral position at the first impression and the lateral position of the web at the first impression may vary even while the lateral position near the paper roll remains constant. The tendency of the paper to shift its lateral position between two points along the printing press is called warp and may be due to humidity, heat effects or lack of accuracy of the printing press. We have found that this warp changes at a very slow rate, and that only an occasionnal small readjustment of the position of a scanner near the paper roll is necessary to give correct lateral position of the web near the first impression.

Thus, according to our present invention, we place a first scanner near the paper roll, and a second scanner near the first impression. The amplifier circuit causes adjustment of the lateral position of the paper roll according to the signals from the first scanner. We provide a second evaluating device, which, from the signals received from both scanners, is responsive to any variations in warp and causes actuation of a second correcting device which readjusts the first scanner to a position which will result in exact alignment of the web near the first impression.

This same principle may be applied to other automatic controls. As an example, it may be applied for the automatic control of the thickness of paper or cardboard in paper mills. In these cases, the thickness of the finished product has to be kept at a certain value and this is done by adjustments at the feedbox which feeds the paper pulp and water. There is a considerable length of web between the feedbox and the finished product and if we inspect thickness of the finished product, any misadjustments will be detected only after the passage of the web from the feedbox to the end of the process. The thickness of the paper could be checked at an earlier point of the process, but a certain thickness of the unfinished product at a certain early stage of the process will not always result in the same thickness of the finished product. Therefore, according to the invention, we inspect the thickness at two points, both at an early stage of the process and at a later stage, preferably at the final stage. Information from the first stage will be used to immediately correct misadjustment at the feedbox, while information from the later stage will be compared with that from the first stage and, when necessary, the information from the later stage will cause correction of the evaluation of the information from the first stage.

In a similar way, the invention may be applied to a variety of other controls in which some errors occur at a relatively fast rate between a point where correction may be applied and a first point where a first inspection may be applied, and some other errors occur at a relatively slow rate between the first point of control and some later stage where the definitive information on the results of the process may be obtained. We apply fast correction in function of the information obtained from said first point of inspection, but evaluate this information from information relative to said slow error gathered from both points of inspection.

Our invention will be described as it is applied to controlling the lateral position of the paper web in a printing press, and particularly as it is applied to the control of the lateral position of the web as it enters the first impression printing cylinder.

Our invention can be best understood by referring to the drawings in which:

Figure 1 is the schematic view showing the relative position of the two scanning units.

Figure 2 is a plan view of the scanning unit positioned adjacent to the paper supply reel showing arrangement of phototubes and light source.

Figure 3 is a view in elevation and partly in cross section corresponding to the view in Figure 2. The arrangements shown in Figures 2 and 3 are illustrated for the scanning unit next to the paper reel however an identical scanning unit not illustrated is positioned adjacent the printing rolls of the printing press.

Figure 4 is a wiring diagram showing the separate circuits for the amplifying tubes in each of the scanning units together with the relays which control the relative movement of the web laterally.

Figure 5 is the wiring diagram for the control circuit which controls the lateral movement of the web and of the reel scanner.

Figure 6:
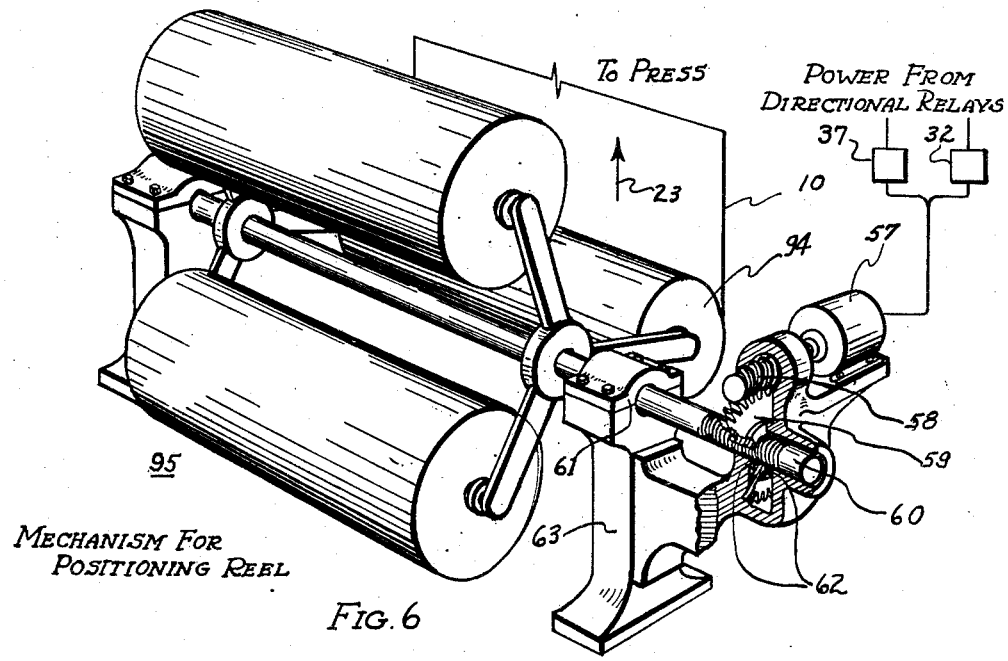
Figure 6 is a schematic and perspective view of the means for shifting the web.

Referring particularly to the Figures 1, 2, and 3, we will explain generally the nature and operation of our device. In Figure 1 is shown a roll of paper 94 which is supported on the reel assembly 95 and which supplies the web 10 to the printing press. The web 10 passes over rollers 96 to 103 inclusive before it arrives at the printing cylinders 104 to 108 inclusive. The web 10 must be maintained in a given lateral position as it enters the printing cylinders 104 to 108 but the means for adjusting the web 10 sideways to correct for any misalignment of the web due to unevenness of the paper roll, misalignment of the rollers 96 to 104 or due to characteristics of the web 10 which cause it to move sideways as it passes over the rollers 96 to 103 is the movement sideways of the reel assembly 95 which carries the roll of paper 94. One scanner 11 is located as close as practical to the roll of paper 94 while the other scanner 93 is located as close as practical to the printing cylinders 104 to 108. It will be explained in the following paragraphs how the reel scanner 11 detects improper lateral position of the web 10 and initiates directly corrective movement of the reel assembly 95 and the roll of paper 94 while the other scanner 93, located at the first impression printing cylinders detects improper lateral position of the web 10 and indirectly causes corrective movement to the reel assembly 95 and roll of paper by initiating sideways movement of the reel scanner 11. This sideways movement of the reel scanner 11 then results in the reel scanner 11 being repositioned relative to the web 10 just as though the web 10 had moved relative to the reel scanner 11. The reel scanner 11 then again initiates corrective movement of the reel assembly 95 and roll of paper 94 in response to the signals originating in the first impression scanner 93.

The reel scanner 11, illustrated in Figures 2 and 3, contains, in addition to an electronic circuit illustrated in Figure 4, phototubes 13 and 14 which are covered by a shield 16. The shield 16 contains openings or slots 18 and 19 positioned over the phototubes 13 and 14 respectively. An exciter light source 21 having a shield 22 is provided. The scanner 11 is positioned relative to the web 10 so that the edge 42 of the web passes between the exciter light source 21 and the phototubes 13 and 14. The web 10 is moving in the direction of the arrow 23 and therefore the device will be described throughout in terms of movement to the left or right as indicated in Figure 2. The web 10 is shown in relationship to the optical system in the correct or in-register position.

In Figures 2 and 3, when the web is in the correct or in-register position it shields phototube 13 putting it in shadow while phototube 14 is in light. The openings or slots 18 and 19 provide definite points in the lateral movement of the web 10 relative to the scanner 11 at which the associated phototube changes from light to dark. This provides definite boundaries for the positions of the web considered as correct.

The scanner 11 must be positioned so that the edge 42 of the web 10 will fall between slots 18 and 19 when the web 10 is in its correct or in-register position. Thus, as the automatic controls function as described herein to keep the edge 42 of the web 10 between slots 18 and 19 they will then keep the web in register laterally. As the web moves to the left it will uncover the slot 18 over phototube 13 and allow light to pass to that phototube. Likewise movement of the web to the right covers slot 19 and interrupts passage of light to phototube 14.

The other scanner 93 which is located near the first impression printing cylinders 104 to 108 (see Figure 1) is identical to the reel scanner 11 described above except for having a slightly different electrical circuit as shown in Figure 4 and which is described later. This scanner 93 contains phototubes 80 and 81 (see Figure 4) which correspond to phototubes 18 and 19 (Figures 2 and 3) respectively in the reel scanner 11. This scanner 93 (Figure 1) must be positioned relative to the web 10 just as scanner 11 is in Figures 2 and 3. Thus, as the web moves left or right relative to the scanner 93, its phototubes will be uncovered or covered just as was described for the corresponding phototubes in the reel scanner 11.

The electrical circuit by which the phototubes in the scanners operate various relays is shown in Figure 4. The entire circuit of Figure 4 receives its energy from a direct current voltage source having a positive terminal B+ and a negative terminal B— with respect to a third terminal connected to the ground. In the reel scanner 11, phototubes 13 and 14 are connected in series with resistors 39 and 40 respectively. The amplifier tubes 25 and 26 have their respective grids connected between their respective phototubes and resistors. Negative grid bias is supplied to amplifier 25 through resistor 39 from the voltage divider composed of resistors 134 and 135 while positive grid bias is supplied to amplifier tube 26 through resistor 40 from the voltage divider composed of resistors 132 and 133. Under the conditions existing when the web is in its correct position, phototube 13 is dark and carries no current while phototube 14 is illuminated and therefore carries some current. Thus, under these conditions, the grids of both the amplifiers are held at a negative voltage thereby preventing sufficient current from flowing through the amplifier tubes to operate either of the relays 28 or 34.

When the web moves to the left, light is admitted to phototube 13 which then allows more current to flow through resistor 39. This raises the voltage applied to the grid of amplifier tube 25 which then causes sufficient current to flow through the amplifier tube 25 to operate the relay coil 28.

When the web moves to the right, light is cut off from phototube 14 which then decreases the current flowing through resistor 40. Since resistor 40 is on the positive side of the phototube, the grid voltage applied to amplifier 26 will be raised and relay coil 34 will be operated.

The circuit of the first impression scanner 93 is substantially identical to that for the reel scanner 11. Here negative grid bias is supplied from the voltage divider composed of resistors 138 and 139 through resistor 110 to the grid of amplifier 84 while positive grid bias is supplied to the grid of amplifier 85 through resistor 111 from the voltage divider composed of resistors 136 and 137. Amplifiers 84 and 85 are held in the nonconducting state when the web is in its correct position in which phototube 80 is dark and phototube 81 is illuminated. Movement of the web to the left which allows passage of light to phototube 80 then raises the grid voltage of amplifier 84 and web movement to the right which cuts off light to phototube 81 raises the grid voltage of amplifier 85. The relays 87 and 90 associated with amplifier tubes 84 and 85 respectively will be operated only if the screen grid voltage applied to the amplifier tubes is sufficiently high.

The voltages for the screen grids of the amplifier tubes 84 and 85 are supplied through shut-off and delay timing circuits which function to prevent the relays 87 or 90 from operating at any time that the corresponding relay 28 or 30 is operated. Also the time delay feature of the circuit keeps relay 87 or 90, as the case may be, inoperative for considerable time after the corresponding relay in the reel scanner circuit has been deenergized. This latter feature allows time for the correction initiated by operation of a relay in the reel scanner circuit to take effect before additional correction can be initiated by the corresponding relay in the first impression scanner circuit.

In the shut-off and time delay circuit for amplifier tube 84, the screen grid voltage for tube 84 is supplied through amplifier tube 114. The timing condenser 118 is usually charged to a high positive voltage through variable resistor 122 and relay coil 28. Thus, the grid of tube 114 is normally held at a high voltage and thus tube 114 is normally conducting and supplying a high voltage to the screen grid of tube 84. Whenever amplifier tube 25 is actuated causing actuation of relay coil 28, the plate voltage of amplifier tube 25 drops to a low value. Then through the connection of the cathode of the diode 126 to the plate of amplifier 25, diode 126 becomes conducting and discharges the timing condenser 118 which also decreases the voltage applied to the grid of tube 114. Decreasing the grid voltage of tube 114 reduces its ability to conduct current and results in sharply reducing the voltage applied to the screen grid of amplifier tube 84. Thus, amplifier tube 84 and relay 87 are rendered inoperative whenever amplifier tube 25 operates relay 28. Now, when the web returns to the correct position with respect to scanner 11 and amplifier tube 25 is deenergized to release relay 28, the plate voltage of amplifier tube 25 rises to a high value which in turn applies a high voltage to the diode 126 and resistor 122. Diode 126 is then rendered non-conducting and the timing condenser 118 recharges through resistor 122. The resistance of resistor 122 is sufficiently high relative to the capacitance of condenser 118 so that considerable time is required for condenser 118 to recharge to the point where the voltage supplied to the screen grid of amplifier tube 84 will be sufficient to allow amplifier 84 to operate relay coil 87. This time delay is adjustable by varying the resistance of resistor 122. Thus, the screen grid voltage applied to amplifier 84 is held low preventing operation of amplifier 84 and relay 87 for a considerable time after relay 28 is released.

The shut-off and time delay circuit associated with amplifier tube 85 is identical to that described above. The screen grid voltage for amplifier tube 85 is supplied through tube 115. The timing condenser 119 is discharged through diode 127 whenever amplifier tube 26 is operated thus shutting off the supply of screen grid voltage to amplifier 85. Timing condenser 119 then must recharge through the resistor 123 after amplifier 26 is deenergized resulting in a time delay after release of relay 34 before amplifier 85 and relay 90 can be operated.

The circuit by which the various relays cause operation of the correcting mechanisms is shown in Figure 5. This circuit receives energy from an electrical power supply. The automatic correction equipment is turned on by closing switch 129 which then closes the circuit to the coil of relay 130. Energization of relay coil 130 then causes closing of contacts 72 and 73 and corresponding shifting of contacts 70 and 71 all of which are operated by relay coil 130. With the automatic control turned on, then, the relay coils 32 and 37 are connected to the double-throw sets of contacts 31 and 36 which are operated by the relays 28 and 34 respectively (see Fig. 4) and the reel scanner positioning motor 142 is connected to the double-throw sets of contacts 91 and 88 which are operated by relays 90 and 87 respectively (see Fig. 4). Thus, leftward movement of the web at the reel scanner, which results in operation of relay 28 and contact 31, closes a circuit from the power supply through contact 36 and contact 72 to the motor starting relay coil 32 which results in moving the web to the right. Likewise, movement of the web to the right at the reel scanner, which causes operation of relay 34 and contact 36 associated therewith, closes a circuit through contact 31 and contact 73 to the coil of motor starting relay 37 which results in moving the web to the left. Similarly in the case of adjustment of the reel scanner, when the web moves to the left at the first impression causing operation of relay 87 and contact 88 associated therewith, the circuit is closed through contact 91 and contact 71 to the coil of the reel scanner positioning motor 142 which will result in the movement of the reel scanner to the right. When the web moves to the right at the first impression scanner, which causes operation of relay 90 and contact 91 associated therewith, a circuit will then be closed to the winding of the reel scanner positioning motor 142 which will cause the reel scanner positioning motor 142 which will cause the reel scanner to be moved to the left.

The pairs of double-throw contacts 31 and 36 or 91 and 88 are so interconnected that after one has been shifted to complete a circuit, as described above, shifting, inadvertently or otherwise, of the other will then open that circuit. Likewise, the second of the pair to shift cannot complete its circuit because of the shifted position of the first. By this interconnection, means are provided such that neither the web correction mechanism nor the reel scanner positioning mechanism can be energized for both directions at once.

Now we will describe how the web is moved laterally as controlled by the circuits described above. Referring to Figure 6, the roll of paper 94 supplying the web to the press is mounted on the reel assembly 95 which also carries additional rolls of paper which are used successively as each roll is used up. The reel assembly can be rotated clockwise to bring successive rolls of paper into the operating position but during the time that one roll of paper 94 is being used the reel assembly is held in the position shown. While being so held the entire reel unit with all rolls of paper can be moved sideways since the shaft 60 supporting the reel unit 95 can slide in the supporting bearing 61 which in turn is supported by the reel frame 63. The end of shaft 60 is threaded and these threads engage corresponding threads in the hub of spur gear 59. Spur gear 59 is prevented from moving in the direction of shaft 60 by bearings 62 on either side of the gear which are fixed to the reel unit support 63. Worm gear 58 mounted on the shaft of the driving motor 57 engages the teeth of the spur gear 59. Thus rotation of the motor shaft drives the worm gear 58 and causes rotation of the spur gear 59. Thus, by the familiar "Jack Screw" principle, rotation of the spur gear 59 causes the shaft 60 to slide through the bearing 61 and causes the reel unit and the roll of paper 94 feeding the web 10 to the press to move sideways relative to the press. The motor 57 is reversible. For one direction of rotation the reel unit is moved to the right and for the other direction of rotation of the motor 57 the reel unit 95 is moved to the left. The motor 57 receives its electrical power through the contacts of relays 32 and 37 which are so connected that when relay 32 is operated by the circuit as described above the motor will run in the direction which will cause movement of the reel unit 95, roll of paper 94 and the web 10 to the right while operation of relay 37 as previously described will cause the motor 57 to run in the reverse direction which causes movement of the reel unit 95, roll of paper 94, and the web 10 to the left.

Figure 7:
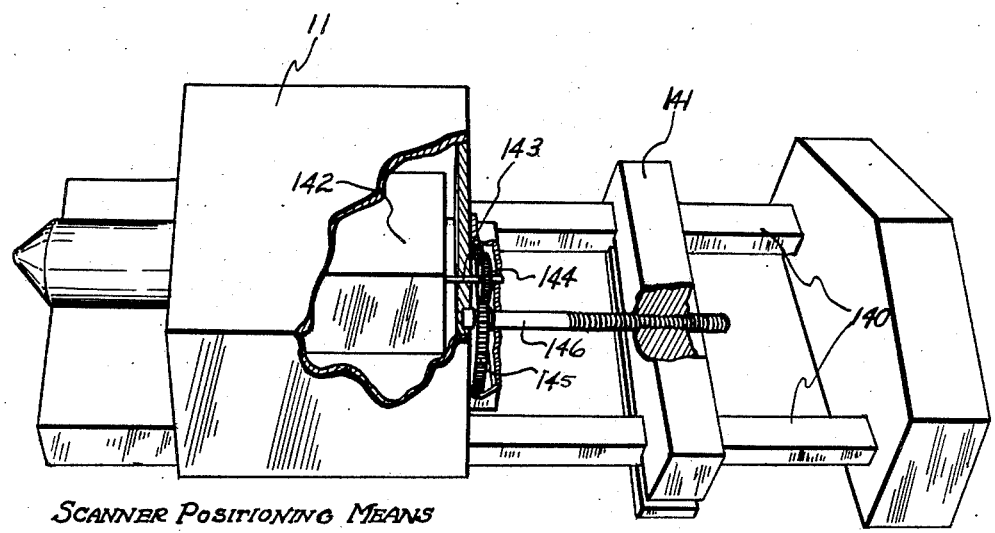
Figure 7 is a schematic view of the means for adjusting the scanner adjacent to the paper supply reel.

The means by which the reel scanner 11 is moved in response to the control circuit described above is illustrated in Figure 7. The scanner 11 is mounted so that it can slide on two way bars 140 which in turn are fixed to the press frame. A reversible motor 142 is mounted inside the scanner 11 and its shaft 143 extends outside of the case of scanner 11. On the outer end of the motor shaft 143 is mounted a spur gear 144. A second shaft 146 is fixed to the scanner 11 case so that it can rotate but cannot move appreciably longitudinally. This shaft 146 extends a considerable distance from the scanner case and is threaded over a portion of its outer end. Spur gear 145 is fixed to the shaft 146 close to the scanner case so that its teeth mesh with those of spur gear 144. Thus, as the motor 142 causes rotation of the motor shaft 143 and spur gear 144, spur gear 145 causes rotation of shaft 146. The threaded end of shaft 146 engages corresponding threads in a positioning bar 141 which is usually tightly clamped to the way bars 140. Thus, again by the well known "Jack Screw" principle, as the scanner motor rotates resulting in rotation of the threaded shaft 146, the shaft 146 screws into or out of the positioning bar 141 pulling the scanner toward the positioning bar or pushing the scanner away from the positioning bar respectively depending on the direction of rotation of the scanner motor 142.

The reel scanner motor 142 receives electrical power as described above (see Figure 5) through actuation of relay contacts 88 and 91. The direction in which the motor 142 runs is dependent upon which of the two coils is energized. Therefore, contact 88 can be connected to that coil which will result, when energized, in causing the scanner 11 to be moved toward the positioning bar 141 or to the right which is the corresponding direction. Likewise contact 91 is connected to that coil of the motor which results in moving the scanner 11 away from the positioning bar 141 or toward the left.

Referring again to Figure 5, when the automatic control of the correcting mechanisms is shut off by opening switch 129 and releasing relay 130, contacts 72 and 73 are opened breaking the circuits to relay coils 32 and 37 respectively. At the same time double-throw contacts 70 and 71 also operated by relay 130 shift their positions disconnecting the reel scanner positioning motor 142 from the double-throw contacts 88 and 91 and reconnecting the motor 142 to the double-throw contacts 36 and 31 respectively. Thus, when the automatic control is turned off, the reel scanner will be moved by actuation of contacts 31 or 36 associated with relays 28 and 34 respectively which are operated as explained above by the circuit of the reel scanner 11 (Figure 4). Contact 31 operated by relay 28 (Figure 4) will now cause the reel scanner to be moved to the left, whenever the web moves to the left, by virtue of contact 31 being connected to the same coil of the motor 142 which previously was connected to contact 91. Likewise contact 36 operated by relay 34 (Figure 4) will now cause the reel scanner to be moved to the right whenever the web at the reel scanner moves to the right. In other words, the reel scanner will be caused to follow along after the web as the web moves sideways during the time that the automatic control is turned off. This feature provides for automatically bringing the reel scanner to its correct position as the web is manually adjusted by the press operator to its correct position during initial setting-up of the press for a new printing job.

We claim:

1. In a controlled device for a moving web having a source of supply and means operating on said web, an automatically controlled laterally-positioning device for said web comprising in combination a first signal sending device adjacent the source of supply and responsive to the lateral position of the web at that point, a second signal sending device responsive to the lateral position of the web at a point near the means operating on said web, a first signal receiving means responsive to the signals received from the first signal sending means, a second signal receiving means responsive jointly to signals from each of said signal sending devices, means adjusting the position of the first signal sending device relative to the lateral position of said web, said latter means responsive to and controlled by the second signal receiving means, and means adjusting the lateral position of the web responsive to and controlled by said first signal receiving means.

2. In a controlled device for a moving web having a source of supply and means operating on said web, an automatically controlled device for maintaining the lateral position of said web substantially constant at a point adjacent said means operating on said web comprising, in combination, a first photoelectric scanner positioned near the source of supply, and a second photoelectric scanner positioned at a point near the means operating on said web, each of said scanners positioned to detect the lateral position of the web at the respective points, adjusting means operably arranged with said web for moving said web laterally, a first electronic circuit connected therewith and with said first scanner responsive to signals received by said first scanner, said adjusting means having its movement controlled thereby in response to said signals, a second electronic circuit responsive to signals received from both of said scanners, and operable means adjusting the lateral position of said first scanner relative to said web connected with and responsive to the signals received from said second electronic circuit.

3. In an apparatus for inspecting a characteristic of a continuous process at different points along the process, and for correcting deviations in said characteristic from the normal comprising means imparting said characteristic to said process, a signal sending device adjacent said last mentioned means and responsive to said characteristic at that point in the process, a second signal sending device positioned near the end of said process and responsive to said characteristic at that point, a first signal receiving means responsive to the signals received from the first signal sending device, a second signal receiving means responsive jointly to signals from each of said signal sending devices, means adjusting the relative position of said first signal sending device relative to said means imparting said characteristic, said adjusting means responsive to and controlled by the second signal receiving means, and means adjusting the means imparting said characteristic when said characteristic deviates from the normal responsive to and controlled by said first signal receiving means.

STEWART EDWIN FRISBIE.
WILLIAM OWEN SMILEY.
JOSEPH C. FROMMER.

References Cited in the file of this patent

UNITED STATES PATENTS

| Number | Name | Date |
|---|---|---|
| 2,117,878 | Friedmann | May 17, 1938 |
| 2,396,706 | Kott | Mar. 19, 1946 |
| 2,534,686 | Strauss | Dec. 19, 1950 |

FOREIGN PATENTS

| Number | Country | Date |
|---|---|---|
| 410,859 | Great Britain | May 28, 1934 |